United States Patent [19]
Benner

[11] 3,760,739
[45] Sept. 25, 1973

[54] CONVEYOR TRACK SWITCH ACTUATED BY A LINEAR MOTOR

[76] Inventor: Jean-Rene Benner, 6 Allees des Vergers, Courtry, France

[22] Filed: June 11, 1971

[21] Appl. No.: 152,330

[30] Foreign Application Priority Data
June 15, 1970 France .......................... 7022004

[52] U.S. Cl. .................................. 104/130, 310/12
[51] Int. Cl. ........................................ E01b 25/26
[58] Field of Search .................... 104/148 LM, 130, 104/172 BT, 98, 103, 104; 246/225, 231; 310/312, 313, 336, 338

[56] References Cited
UNITED STATES PATENTS
| | | |
|---|---|---|
| 1,917,837 | 7/1933 | Haddlesay .......................... 104/104 |
| 3,374,823 | 3/1968 | Ford .............................. 310/13 X |
| 2,546,454 | 3/1951 | Kromholz ......................... 246/160 |
| 3,533,188 | 10/1970 | Jones et al. ........................ 49/360 |

*Primary Examiner*—Gerald M. Forlenza
*Assistant Examiner*—George H. Libman
*Attorney*—Stevens, Davis, Miller & Mosher

[57] ABSTRACT

A linear induction motor switch tongue actuating arrangement producing a propelling force having a high starting value and a value which falls with growing speed of the switch tongue. A linear induction motor stator element co-operates with an armature plate secured to the switch tongue. The stator energization may be used to operate an electromagnetic locking device for the tongue.

3 Claims, 7 Drawing Figures

PATENTED SEP 25 1973 3,760,739

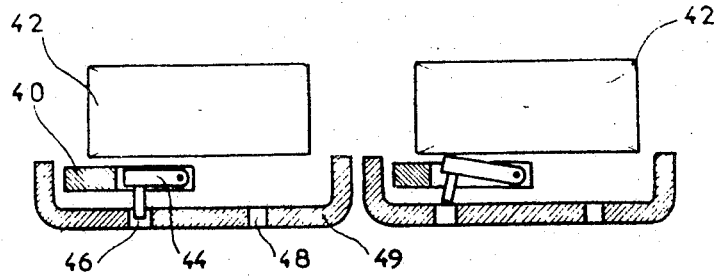
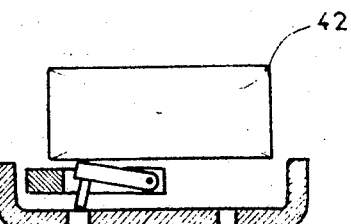
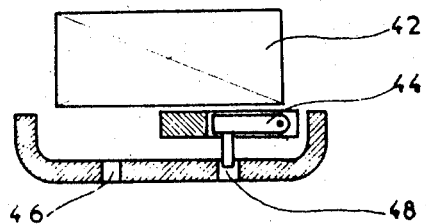
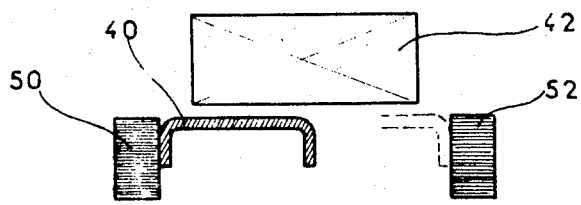
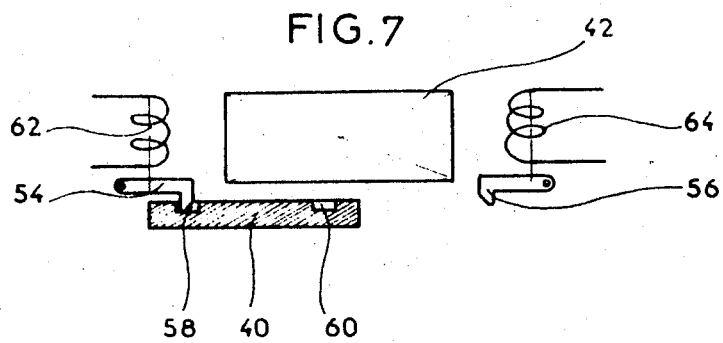

CONVEYOR TRACK SWITCH ACTUATED BY A LINEAR MOTOR

This invention relates to a switch particularly for an overhead conveyor, comprising a switch tongue adapted to be moved between two terminal operative positions in alignment with rails of a track to switch a truck movable on the track on a selected path.

The moving element of the switch is ordinarily a rail tongue which is pivoted into alignment with the selected track rail.

In known automatic systems the track is switched by means of air-operated actuators, mechanical springs, electric rotation motors driving the tongue via reducers, or electromagnetic solenoids. These known systems are either of complicated construction and expensive or else are of low power and respond too slowly.

An object of the present invention is to obviate these drawbacks and to provide a very simple device of high starting power.

Another object of the invention is to provide rapid actuation of the switch to increase the conveyor capacity.

Another object of the invention is to enable the rail tongue to move rapidly and smoothly.

The track switch according to the invention is provided with a linear induction electric motor whose armature plate is rigidly secured to or formed by the moving switch tongue. Any mechanical connection between the moving part and the stationary part of the motor is avoided with the motion being transmitted by the electromagnetic forces produced by the field structure of the linear motor. The latter can be of the single face or double face kind with the length of its armature being appropriate to the required operative movement.

Linear induction motors have a characteristic giving a very high starting torque or thrust which decreases in proportion as the speed of the moving part increases. This factor, taken together with the reduced inertia of the moving parts, helps to provide rapid acceleration and a reduction of end-of-travel impacting. The devices according to the invention therefore have a long working life despite frequent rapid movements.

Another advantage of linear motor drive is that a driving torque is available to either hand and that the moving parts can be located in their operative end positions by the maintained motor thrust.

The switch tongue may be locked mechanically, unlocking occurring automatically by energization of the linear motor for instance by the electromagnetic forces produced by the motor field structure which act on the locking element of an armature. The high starting torque of linear motors also allows mechanical latching or latching by means of permanent magnets.

Other advantages and features of the invention are disclosed by the following description of various exemplary non-limitative embodiments of the invention shown in the accompanying drawings wherein :

FIGS. 3, 4 and 5 are each a view, in the left-locked position, change-over position and right-locked position respectively, of a locating facility which can be associated with the actuation of the moving junction element of FIG. 1 ;

FIG. 6 is a view similar to FIG. 3 of an embodiment of a locating facility according to the invention, and FIG. 7 shows another embodiment of a locating facility in which solenoids actuate locking tappets or the like.

Figure 1:
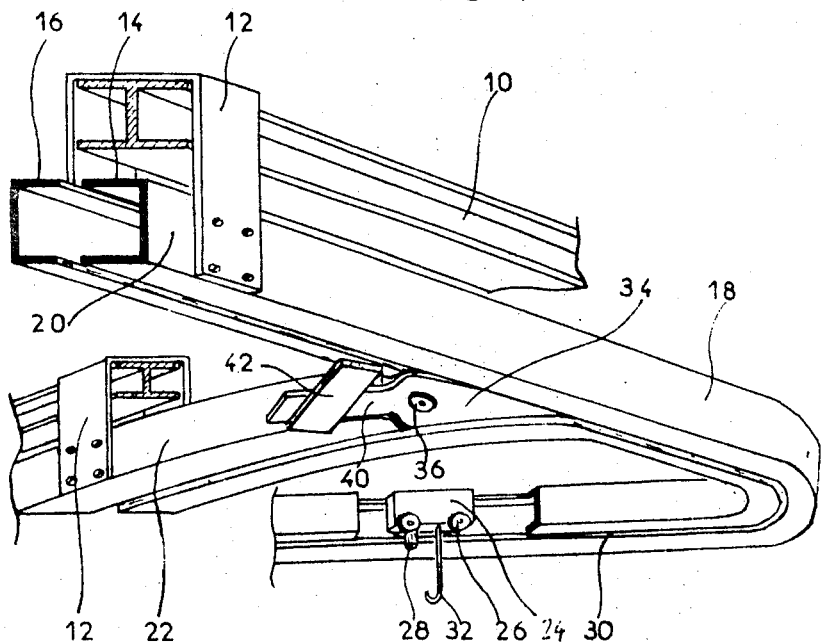
FIG. 1 is a diagrammatic perspective view of a linear motor operated switch according to the invention in which some of the track has been broken away to show the truck.

Referring to FIG. 1, a supporting beam 10, only some of which is shown, bears stirrups 12 the like carrying the tracks of an overhead conveyor including a runway being formed by two channel bars 14, 16. In the switching zone shown in FIG. 1, track section 18 splits into a straight-ahead or normal branch track 20 and a turn-out branch track 22, so that a truck on track 18 can be directed either to branch 20 or to branch 22. The trucks 24 have rollers 26 running on the bottom flanges of the bars 14, 16 and one or more vertical-axis guide rollers 28 which are engaged in gap 30 between the two bars or members 14 and 16. A load hook 32 extends through the gap 30. Conveyors of this kind are known and have been disclosed, e.g., by French patent specification no. 1,589,474. Advantageously, the trucks 24 have a linear electric motor drive system for moving them along the track. Any other form of drive can be used and this invention is of course of use with any kind of conveyor and transport system.

Figure 2:
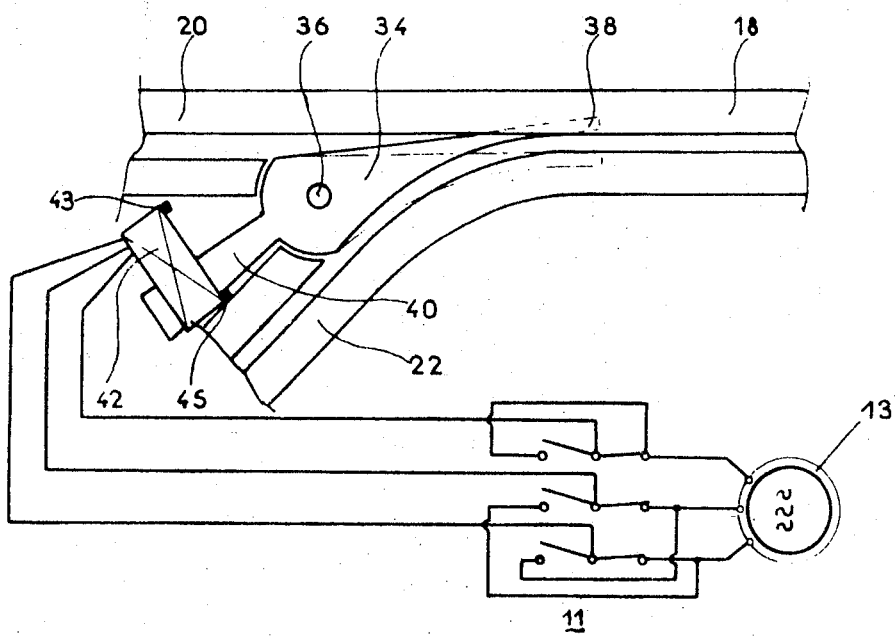
FIG. 2 is a partial view to an enlarged scale of FIG. 1 and is a bottom view of the tracks in the junction zone.

The bars 14, 16 which form the track 18 diverge in a known manner in the switch zone to form the outside elements of the branch track 20 and branch track 22. The inside elements of the branches 20, 22 meet at a splice in the switch zone and leave a gap or space for the passage of the truck 24. The gap can be bridged by a moving switch tongue 34 pivoted to a stationary pivot 36 so that its top 38 can co-operate with either bar of the track 18. When the tongue 34 is in the position shown in FIG. 2 a truck moving along path or track 18 is directed on to branch 22 by its guide rollers 28 which bear on tongue 34. By pivoting the tongue 34 into the broken-line position in FIG. 2, the truck moves to the normal track branch 20. Switches of this kind are known and need not therefore be described in greater detail.

According to the invention the tongue 34 is pivoted by a linear induction motor. To this end, the tongue 34 is extended by a plate-like heel or tailpiece 40 or the like which is disposed opposite a wound stationary magnetic field structure 42 adapted to produce a traveling magnetic field which co-operates with the armature element 40 to shift or, more accurately, to pivot the same around the vertical pivot pin 36. The stationary field structure 42 is long enough to co-operate with the armature 40 throughout the entire pivoting movement of the tongue 34, such movement being limited by end stops 43, 45 which define the end positions of the tongue 34. The armature 40 can be either an ordinary plate made of a conductive material such as aluminum, so as to greatly reduce the moving mass and therefore the inertia of the moving system, or it can be embodied by a conductive plate juxtaposed with a ferromagnetic plate serving as magnetic yoke. In a known manner a stationary magnetic return yoke (not shown) can be disposed opposite the field structure 42, or instead of the yoke, a core member with a second field structure can be used to increase the motor thrust. The direction of motor thrust and therefore the direction of movement of the tongue 34 can be reversed by changing over two phases. For this purpose a selector switch 11 connects the windings of stator 42 to a source 13 of three phase electric power. The switch permits energization of the stator winding for a given phase order; for the inverse phase order, and, permits also, if desirable, the windings to be disconnected from the source when the switch is in a third position.

The switch shown in FIG. 1. and 2. operates by energization of the field structure 42 in an appropriate direction. Such energization produces a moving or traveling field and the armature 40 experiments a thrust which pivots it and the associated tongue 34 around the pivot pin 36 until it reaches the opposite end position. The tongue 34 moves very fast due to the low inertia of the moving system, and the impact of the end stop is relatively slight. Keeping the field structure 42 energized is a means for locating the tongue 34 and obviating any accidental movement thereof.

The tongue 34 can of course be located in either of its end positions in any other way not involving the continued energization of the linear motor 40, 42, FIGS. 3 to 5 show an embodiment of a locating device using a locking latch. In FIGS. 3—5 the field structure is disposed above the armature 40 but this feature does not alter the operation of the device. A latch 44 is pivoted to the armature 40 in the zone co-operating with the field structure 42; a locking finger extends from the latch 44 and is engageable in apertures 46, 48 in a stationary locking plate. The latch 44 is made of a ferromagnetic material and can be pivoted towards the field structure 42 by the electromagnetic field produced thereby to release the finger from the apertures 46 or 48 (see FIG. 4). This unlocking occurs upon energization of the field structure 42 and the released armature plate 40 can be moved by the moving magnetic field produced by the field structure 42. When the armature 40 reaches the end of its travel as shown in FIG. 5, the field structure becomes de-energized and the latch 44 returns to its locking position by gravity or any other similar means. Clearly, this very simple feature can provide properly defined bistable positions.

Preferred positions can be provided by mechanical latching or by means of permanent magnets exerting on the moving system a locking force which the driving torque produced by the field structure 42 can overcome, and FIG. 6 shows an example of bistable location using permanent magnets 50, 52 co-operating with armatures associated with the armature plate 40.

The armature plate 40 or associated tongue 34 can be locked in any other way, for instance, as shwon in FIG. 7, where a locking latch 54 and 56 is disposed at each end position and can engage in an associated recess 58, 60 in the moving armature 40. When the latch or pawl 54, 56 or the like is engaged, the armature plate 40 is locked in a stable position. Associated with each latch 54, 56 is an electromagnet 62, 64 which when energised attracts the latch 54 or 56 into a retracted position to enable the armature plate 40. Advantageously, energization of the electromagnet 62, 64 and of the field structure 42 is simultaneous to simplify the electrical control circuit. Of course, separate actuation can be used.

The invention is not of course limited to any one particular kind of switch.

What is claimed is:

1. A device for actuating a conveyor track switch tongue assembly pivotally mounted to selectively direct a mobile into one or the other of a pair of branch tracks, comprising a polyphase source of electric energy, a conductive armature plate integral with said switch tongue assembly and defining a planar end face extending perpendicular to the pivot axis of said switch tongue assembly, a stationary, polyphase wound, linear induction motor magnetic field structure having a planar stator surface facing said end face and extending parallel thereto along the entire stroke thereof to define a small gap therewith, said magnetic field structure being adapted to generate, when polyphase energized, a magnetic field traveling along said stator surface in a first direction substantially parallel to the direction of movement of said armature plate or in the opposite direction to produce a propelling reaction force in said armature plate, selector switch means connecting said source to said magnetic field structure in a manner causing said magnetic field structure to selectively generate a magnetic field traveling in said first direction or in said opposite direction, means for locking said switch tongue assembly into either of two positions, said locking means including a latch pivotally connected to said armature, said latch having a locking finger extending therefrom and being made of ferromagnetic material, and a stationary locking plate having two apertures for receiving said locking finger, said magnetic field structure, during the energization thereof, providing an electromagnetic field for attracting said latch to remove said finger from one aperture and for moving said armature to position said finger near the other aperture.

2. A device for actuating a conveyor track switch tongue assembly to selectively direct a mobile into one or the other of a pair of branch tracks, comprising a polyphase source of electric energy, a switch tongue and an oppositely directed conductive armature plate on said switch tongue assembly, said switch tongue assembly being pivotally mounted intermediate said switch tongue and said armature plate, said armature plate extending between said pair of branch tracks, a stationary, polyphase wound, linear induction motor magnetic field structure having a planar stator surface extending longitudinally chordwise between said branch tracks opposite said armature plate along the entire stroke thereof to define a small gap therewith, said magnetic field structure being adapted to generate, when polyphase energized, a magnetic field traveling lengthwise of said stator surface to produce a propelling reaction force in said armature plate, and selector switch means connecting said source to said magnetic field structure in a manner causing said magnetic field structure to drive said switch tongue assembly selectively in one way or the other.

3. A device according to claim 2, further comprising means for locking said switch tongue assembly into either of two positions, said locking means comprising a latch of ferromagnetic material movably supported by said armature plate and having a locking member adapted to engage a pair of stationary catches to lock said switch tongue assembly in said positions, respectively, said magnetic field structure, during the energization thereof, providing a magnetic field for attracting said latch to disengage said locking member from the corresponding catch and for moving said armature plate with said latch to position said locking member in confronting relation with the other catch.

* * * * *